July 2, 1940.　　　　　G. MEACHAM　　　　　2,206,788
ELEVATING TRUCK
Filed Oct. 13, 1939　　　　2 Sheets-Sheet 1
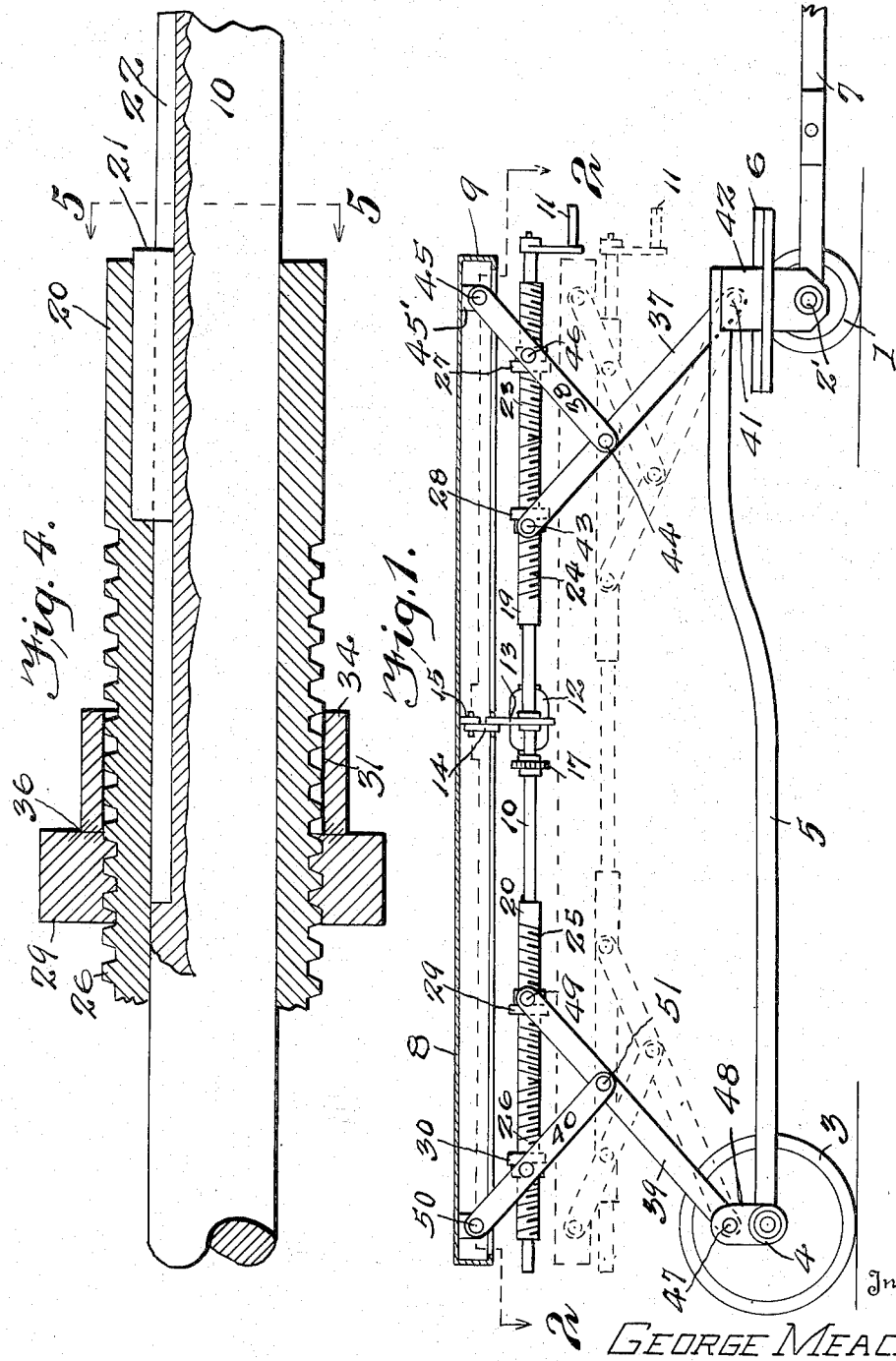
Inventor
GEORGE MEACHAM
By J Calvin Yeatter
Attorney July 2, 1940.　　　　G. MEACHAM　　　　2,206,788
ELEVATING TRUCK
Filed Oct. 13, 1939　　　2 Sheets-Sheet 2
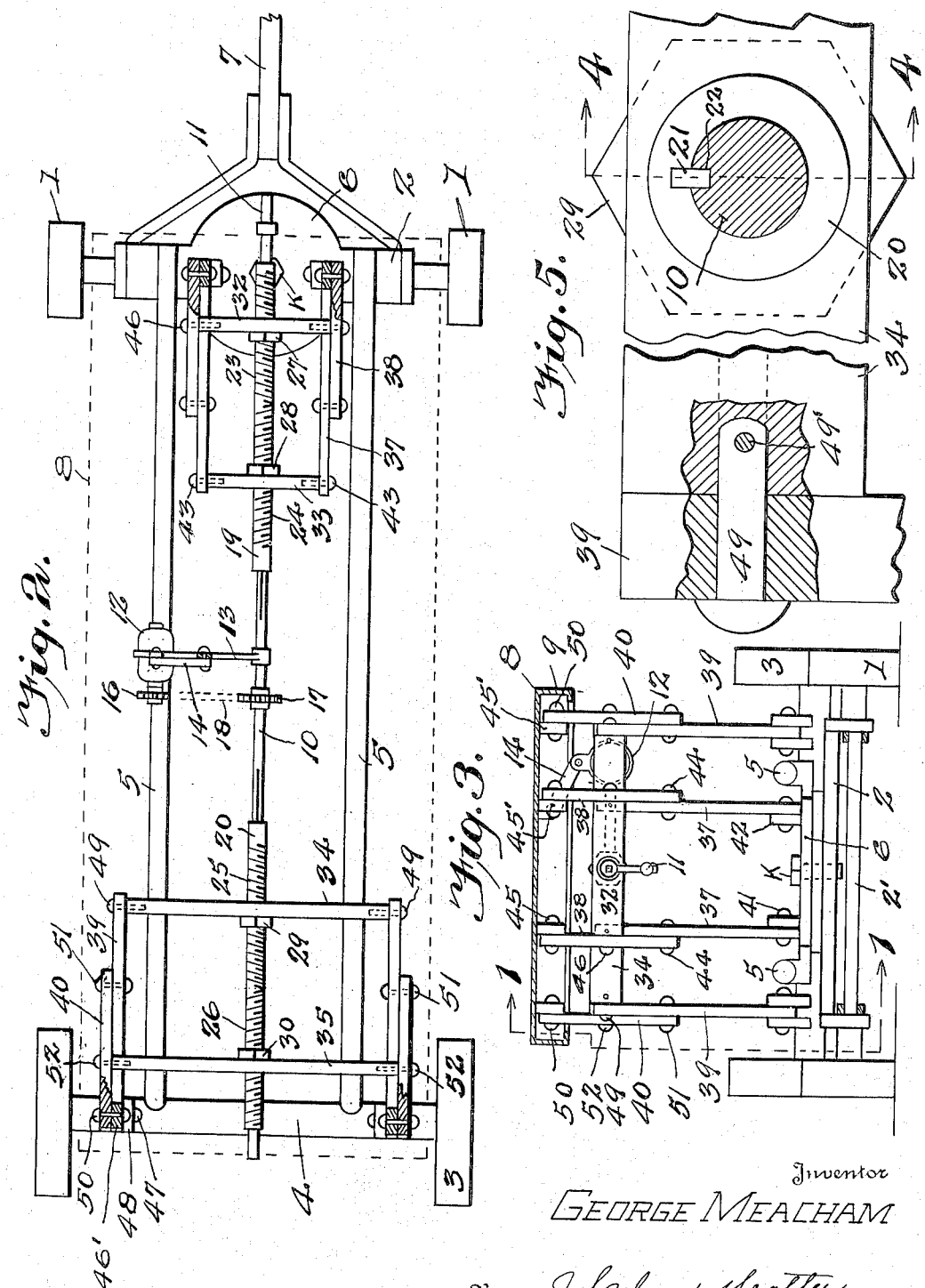
Inventor
GEORGE MEACHAM
By J. Calvin Yeatter
Attorney Patented July 2, 1940

2,206,788

UNITED STATES PATENT OFFICE 2,206,788

ELEVATING TRUCK

George Meacham, Clearwater, Fla.

Application October 13, 1939, Serial No. 299,377

6 Claims. (Cl. 254—126)

My present invention relates to improvements in elevating trucks of the wheeled type, and the elevating mechanism forming the essence of my invention, while here shown as specifically embodied in a baggage truck for use at railway and other stations, terminals, etc., is also applicable for various other uses and purposes.

In carrying out my invention I employ duplex mechanism operated by complementary longitudinally slidable and rotatable tubular screw bars, the mechanism being supported on a base and the loading and unloading deck or platform being supported on the duplex elevating mechanism, which forms the supporting frame for the deck or platform.

Manually operated means are employed for elevating and lowering the deck or platform, and for heavy-duty mechanism the power for elevating and lowering the deck or platform may be available for use from a motor mounted in suitable position for the purpose.

For convenience of illustrating the invention I have employed a truck or carrier of the baggage-truck type in which a minimum number of parts are compactly arranged and readily assembled for facile operation, and the co-operating parts of the elevating mechanism form a rugged and durable support for the loading and unloading deck regardless of the height of the deck above the supporting base or truck.

The invention consists in certain novel combinations and arrangements of parts as will hereinafter be more specifically set forth and claimed. In the accompanying drawings I have illustrated one complete example of the physical embodiment of my invention in which the parts are combined and arranged with a truck forming a portable base, but it will be understood that the elevating mechanism and its loading and unloading deck or platform may be used with other types of bases. Changes and alterations may also be made in the elevating mechanism, within the scope of my appended claims without departing from the principles of my invention.

Figure 1 is a view in side elevation of a wheeled truck employed as a base for the elevating mechanism, as shown at line 1—1 of Figure 3, with the deck in section, the mechanism being shown by dotted lines in lowered position and also shown, by full lines, in partially elevated position.

Figure 2 is a top plan view, as at line 2—2 of Figure 1, with parts in sectional detail, the deck being shown in dotted outline for convenience of illustration.

Figure 3 is a front elevation of the truck, with the deck shown in transverse section.

Figure 4 is an enlarged longitudinal sectional view, as at line 4—4 of Figure 5, showing part of one of the duplex screw-operating parts, together with the operating shaft.

Figure 5 is a broken, transverse sectional view, as at line 5—5 of Figure 4, showing the operating shaft, one of the traveling nuts on the tubular screw, and a portion of a cross beam mounted as a bearing sleeve of the nut.

In order to disclose the general arrangement and utility of parts, I have shown in the assembly views Figures 1, 2, and 3 a truck or portable base for the elevating mechanism, including the front wheels 1, 1 and axle housing 2 for the front axle 2'; also the rear wheels 3, 3 and rear axle housing 4 with the front and rear axle housings joined by a pair of reach rods 5, 5; the fifth-wheel 6, the king bolt K, and the pivoted handle 7 for the truck; all of which are of conventional type. The loading and unloading deck 8 with its downwardly extending flanges 9 is or may also be of conventional type.

In the utilization of my elevating mechanism for the deck 8 I employ a longitudinally extending, central, operating shaft 10 located beneath the deck and above the truck or base, which shaft may be turned, manually by use of the crank handle 11 preferably mounted on the shaft at the front of the vehicle, or for heavy-duty mechanism the shaft may be revolved by power from a motor indicated at 12. This motor is supported by means of a flexible frame including a link 13 pivotally mounted at one end on the operating shaft, and a suspending link 14 connecting the motor frame with a bracket 15 at the under side of the deck. A drive sprocket 16 on the motor shaft and a driven sprocket 17 on the operating shaft together with a dotted sprocket chain 18 illustrate one manner of transmitting power from the motor to the operating shaft.

The duplex elevating mechanism mounted beneath the deck or platform 9 and above the base formed by the truck frame, includes a front section mounted on the non-rotatable part 6 of the fifth-wheel, and a rear section mounted on the non-rotatable axle housing 4. For operating these duplex sections simultaneously in raising and lowering the deck, I employ a pair of spaced tubular screws 19 and 20, which revolve with the operating shaft, and which are also longitudinally shiftable or slidable on the operating shaft toward and away from one another when the shaft is turned, as indicated by the dotted line position and the full line position in Figure 1.

These tubular screws are keyed as at 21 to slide in the longitudinally extending exterior grooves 22 of the operating shaft, and each tubular screw is fashioned with a set of left hand threads 23 and right hand threads 24, and left hand threads 25 and right hand threads 26, respectively.

Upon each set of threads, reading from front to rear in Figures 1 and 2 is mounted in a non-rotatable but traveling nut, as 27, 28, 29 and 30, and each nut is provided with a bearing 31 of cylindrical shape and smooth interior bore, which provides a wide bearing surface for the nuts on the screw threads, which threads, as indicated in Figure 4 are square. These bearing extensions each forms a part of a cross beam, of which there are four here shown, and the cross beams form rigid parts of the nuts. As indicated the central part of each cross beam is welded to a nut (Fig. 4) or the nuts and beams may be rigidily connected in other suitable manner to prevent rotation of these nuts when the shaft is turned, and also to provide bearing supports for the shaft and its screws. The front section is provided with two horizontal cross beams 32 and 33, and the rear section is provided with two longer cross beams 34 and 35, each of which is rigid with a non-rotatable nut, as indicated at 36 in Figure 4.

The elevating and lowering mechanism for the deck 8 actuated by the operating shaft and tubular screws, through the four nuts and their cross beams, includes two front sets and two rear sets of elevating devices, each set comprising two long levers 37 and two shorter lever arms 38 of the front section, and two long levers 39 and two shorter lever arms 40 of the rear section of the elevating mechanism.

Each of the front levers 37 is pivotally supported at its lower end by a pivot 41 in a fixed bracket 42 mounted on the non-rotary part 6 of the fifth wheel of the truck, and the upper ends of each of these levers are pivoted at 43 at the opposite ends of a cross beam 33.

The two lever-arms 38 at their lower ends are pivoted at 44 to the two levers 37, and at their upper ends these arms are pivoted at 45 to the oppositely arranged fixed supports 45' on the underside of the deck.

Intermediate its pivoted ends, each of the lever arms is pivoted as at 46 to the opposite ends of the cross beam 32.

In like manner, but in opposed arrangement, the rear levers 39 are each pivoted as at 47 on spaced supporting brackets 48 fixed to the rear axle housing 4 as a base, and the upper ends of these levers are pivoted at 49 at the opposite ends of the cross beam 34, as best seen in Figure 5 where a transverse pin 49' is employed to hold the pivot bolt 49 rigid with the beam so that lever 39 may swing relatively to the cross beam.

The rear lever arms 40, 40 are each pivotally suspended at 50 from brackets as 45' fixed to the underside of the deck, they are also pivoted to levers 39 at 51, and at 52 they are pivoted at the opposite ends of the cross beam 35.

Thus each of the front and rear sections are pivotally supported at 41 and 47 respectively on the stationary base or support, and these levers, through the lever arms pivotally supported at 45 and 50 support the deck in any adjusted position, while the pairs of cross beams mounted in the respective elevating frames on three floating pivots support the rotary shaft and its tubular rotary screws.

In Figure 1 where the deck and the elevating mechanism are shown by dotted lines in lowered position, it will be seen that by turning the crank 11 clockwise, together with the two tubular screws, the two elevating sections together with the two tubular screws are spread apart to swing all of the levers and all of the lever arms toward upright position, thus elevating the deck as seen in Figure 1 where it is partially elevated.

By turning the handle or crank 11 anti-clockwise, when the deck is uplifted as indicated by full lines in Figure 1, the two elevating sections together with the two tubular screws are swung nearer together and away from upright position, with the tubular screws sliding toward the longitudinal center of the operating shaft to the dotted, lowered, position of Figure 1.

Due to the duplex and opposed arrangement of the two sections of the elevating mechanism including the two tubular operating screws, when the deck is being elevated the right hand threads 24 turning in the nut 28 and the left hand threads 25 turning in nut 29 the two pairs of levers swing upwardly and outwardly on pivots 41 and 47 toward upright position. The pairs of arms 38 and 40, guided by the nuts 27 and 30 are swung on their pivots 44, 51 toward upright position, but they swing upwardly and inwardly, to elevate the deck 8. At the same time the two tubular screws are slid or shifted outwardly on the operating shaft, and the deck may be held in desired adjusted position by co-action of the nuts and screws.

The two sections of the elevating mechanism provide for a level or horizontal position of the deck at all times and they provide supporting frames for the deck symmetrically braced against longitudinal movement as well as lateral movement of the deck and its supporting frames.

When the elevated deck is to be lowered by turning the crank handle 11 anti-clockwise, the right hand threads 24 turning in nut 28 and the left hand threads 25 turning in nut 29, swing the levers inwardly and downwardly. The arms 38 and 40 swing outwardly and downwardly, and nuts 27 and 30 slide the tubular screws inwardly to the dotted line position of Figure 1.

The levers, and the lever arms, are at all times in inclined position, the degree of inclination varying with the vertical adjustment of the deck, and the range of adjustment for the deck is determined by the dimensions of the levers and lever arms together with the range of the operating screws and nuts.

As before stated, changes and alterations may be made in the construction and arrangements of the combined parts forming the duplex elevating mechanism, and it will be understood that the drawings exemplify only one mode for physically embodying my invention.

Having thus fully described my invention, what I claim as new and desire to secure by Letters Patent is:

1. In an elevating mechanism, the combination with a base and a spaced vertically adjustable deck, and a laterally spaced pair of inclined levers pivotally supported on the base, of a pair of oppositely inclined lever arms pivotally connecting said levers and the deck, and operating means pivotally connected to and also co-acting with the levers and with the arms for swinging said members toward upright position.

2. In an elevating mechanism, the combination with a base and a spaced vertically adjustable deck, of a pair of laterally spaced inclined levers pivotally supported on the base, a pair of oppositely inclined arms pivotally connecting said levers and the deck, a cross beam pivotally connecting the upper ends of the levers, a cross beam pivotally connecting the arms intermediate their ends, and operating means co-acting with said cross beams for swinging said pairs of members toward upright position.

3. In an elevating mechanism, the combination with a base and a spaced vertically adjustable deck, of a pair of laterally spaced inclined levers pivotally supported on the base, a pair of oppositely spaced arms pivotally connecting said levers and the deck, a cross beam having a rigid nut and pivotally connecting said levers, a cross beam having a rigid nut and pivotally connecting the arms intermediate the ends, a screw having opposed threads mounted in the nuts, and means for turning the screw.

4. In an elevating mechanism, the combination with a base and a spaced vertically adjustable deck, of a pair of laterally spaced inclined levers pivotally supported on the base, a cross beam pivotally connecting the free ends of the levers and a traveling nut rigid with the cross beam, a pair of oppositely inclined arms pivotally connecting the levers and the deck, a cross beam pivotally connecting said arms intermediate their ends and a traveling nut rigid with said cross beam, a rotary operating shaft, a tubular screw mounted on the shaft to turn therewith and slidable thereon, and said screw having exterior opposed threads engaged in said nuts.

5. In a duplex elevating mechanism, the combination with a supporting base and a vertically adjustable deck, of two complementary elevating frames each pivotally connected with said base and said deck, a single rotary operating shaft, a pair of spaced tubular screws mounted on the shaft to turn therewith and slidable thereon, each of said screws having sets of opposed exterior threads, a pair of cross beams mounted in each frame, a nut rigidly mounted on each beam, and each of said nuts having a set of threads mounted therein.

6. In a duplex elevating mechanism, the combination with a supporting base, and a vertically adjustable deck having fixed supporting brackets, of two oppositely arranged frames each comprising a pair of inclined levers pivotally supported on the base, two oppositely inclined arms pivotally connected at their upper ends to said brackets, said arms at their lower ends being pivoted to said levers, and operating means pivotally connected with said levers and arms, whereby each set of levers and arms is swung toward upright position to elevate the deck.

GEORGE MEACHAM.